United States Patent Office 3,212,177
Patented Oct. 19, 1965

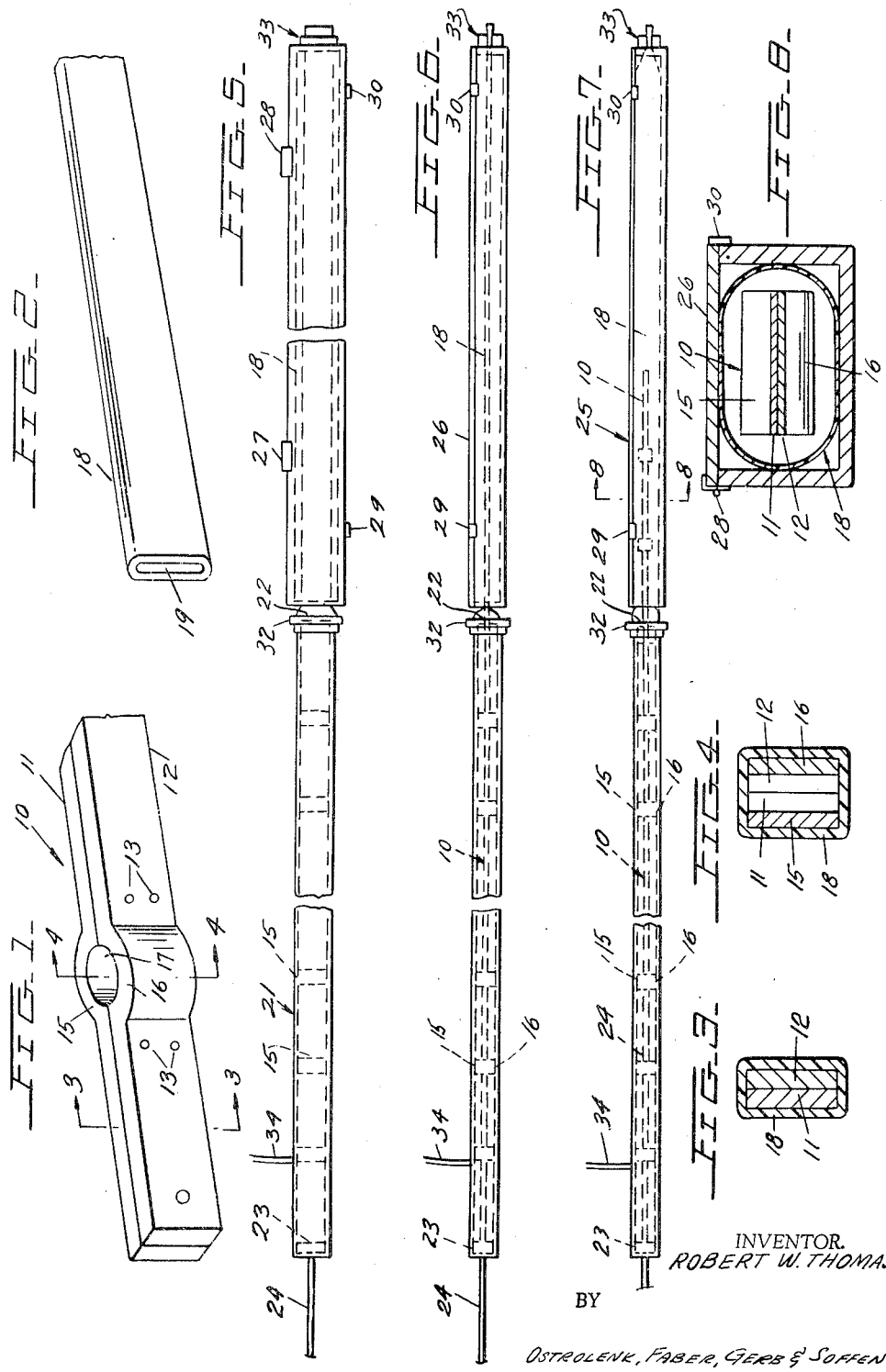

3,212,177
APPARATUS FOR PRODUCING A BUS BAR
COVERED WITH AN ELASTIC SLEEVE
Robert W. Thomas, St. Clair Shores, Mich., assignor to
I-T-E Circuit Breaker Company, Philadelphia, Pa., a
corporation of Pennsylvania
Original application June 13, 1960, Ser. No. 35,827.
Divided and this application May 15, 1963, Ser. No.
280,632
3 Claims. (Cl. 29—235)

This application is a divisional application of my copending case S.N. 35,827 filed June 13, 1960, now abandoned, entitled "Method for Producing a Bus Bar Covered With an Elastic Sleeve."

This invention provides a novel procedure for quickly and easily covering a flat or irregularly shaped bus bar with a sleeve of flexible material which is snugly fitted thereto.

Most applications of bus bars is electrical structures, especially electric distribution duct, require insulating means between the bus bars and the steel structural members as well as between bus bars. For the most part the bus bars have been insulated by utilizing tape which was wrapped around the bus bars or by utilizing over sized tubes which were subsequently shrunk on to the bus bar. Still another method comprises extruding the insulation directly on the bus bar in a manner similar to the method used for insulated wire.

In the electric distribution duct described in detail in the J. B. Cataldo copending application Serial No. 7,810 filed February 10, 1960, now Patent No. 3,012,218 entitled "Bus Duct Having Stacked Bus Bars" and assigned to the assignee of the instant invention, irregularly shaped bus bars are covered by a butyl rubber sleeve having a thick-wall. Existing methods for placing the bar in the sleeve were unsuccessful since the bar was not of uniform cross-section. It was necessary to expand the cross-section of the sleeve to provide for easy entrance of the bus bar. The sleeve was either forced onto the bus bar by wringers or by stretching the sleeve. This proved unsuccessful in production since the bus bar in question contained many irregularities.

The instant invention overcomes the previously noted disadvantages of the prior art by providing a novel method which includes inflating the sleeve by subjecting the interior thereof to a pressure in excess of the external pressure. Thereafter, the insertion of the bus bar into the expanded sleeve is a simple operation.

In greater detail the method consists of placing the bus bar in a chamber which is opened at one end and is provided with a push rod extending through the other end at a sliding seal. The sleeve is then placed in an over-sized cage which is in axial alignment with the chamber. One end of the sleeve is clamped over the open end of the chamber and the other end of the sleeve is sealed by a clamp.

High pressure air is then introduced into the chamber. This air enters the interior of the sleeve causing it to stretch with this stretching being confined by the cage. The stretched sleeve is of considerably larger cross-sectional area than the largest cross-sectional area of the bus bar. The plunger is then moved toward the sleeve driving the bus bar into the sleeve. The plunger is withdrawn and the high pressure within the chamber is reduced so that the sleeve becomes deflated and is snugly fitted to the bus bar.

Accordingly, a primary object of this invention is to provide a novel process for covering an irregularly shaped member with a snugly fitting elastic covering.

Another object is to provide a novel method of this nature wherein the elastic covering is expanded to a size larger than the largest cross-sectional area of the member to be inserted therein.

Still another object is to provide a novel method for covering a bus bar with a closely fitted elastic sleeve wherein the sleeve is utilized to seal an open ended chamber containing the bus bar and high pressure air is introduced into the chamber to inflate the sleeve.

These as well as other objects of this invention shall become readily apparent after reading the following description of the accompanying drawings in which:

FIGURE 1 is a fragmentary perspective view of a bus bar.

FIGURE 2 is a fragmentary perspective view of an elastic sleeve which will cover the bus bar of FIGURE 1.

FIGURES 3 and 4 are cross-sections of the bus bar of FIGURE 1 with the sleeve of FIGURE 2 mounted thereon.

FIGURE 5 is a plan view of the apparatus utilized for inserting the bus bar of FIGURE 1 into the sleeve of FIGURE 2 in accordance with the teachings of the instant invention.

FIGURE 6 is a side elevation of the apparatus illustrated in FIGURE 5.

FIGURE 7 is a view similar to FIGURE 6 with the bus bar partially inserted into the inflated sleeve.

FIGURE 8 is a cross-section taken through line 8—8 of FIGURE 7 looking in the direction of arrows 8—8.

Now referring to the figures, bus bar 10 comprises two laminates 11 and 12 secured together by rivets 13. Each of the bus bars 11, 12 are provided with offsets 15, 16, respectively, which cooperate to define pocket 17 adapted to receive a contact of a bus duct plug (not shown). Bus bar 10 is covered with an elastic sleeve 18 by a process to be hereinafter described. In figure 2 sleeve 18 is illustrated in a relaxed condition wherein the longitudinal passage 19 therethrough is smaller in cross-sectional area than the cross-sectional area of the straight portions of bus bar 10 and is considerably smaller in cross-sectional area than the offset portions of bus bar 10. This insulation covered bus bar construction is described in detail in the aforesaid copending application Serial No. 7,810, now Patent No. 3,012,218.

The novel means for inserting bus bar 10 into sleeve 18 is by first inserting bus bar 10 into chamber 21 through the open end 22 thereof. The other end of chamber 21 is provided with a sliding seal 23 having push rod 24 extending therethrough so as to be operable externally of chamber 21. Elastic sleeve 18 is then placed into cage 25 which is opened at both ends. Cage 25 is provided with a cover 26 hinged at 27, 28 along one edge thereof and the other edge is provided with clips 29, 30 to maintain cover 26 closed.

Cage 25 and chamber 21 are in axial alignment in closely spaced end to end relationship. When bus bar 10 is being inserted into cage 25, cage cover 26 is open.

The left end of sleeve 18 is stretched and fitted over chamber 21 at its open end 22.

A sealing connection is then formed between sleeve 18 and chamber 21 at the open end 22 thereof by utilizing a collar type clamp 32. The other end of sleeve 18 extends beyond the right hand end of cage 25 and is sealed by utilizing clamp 33.

Compressed air is then introduced into chamber 21 through air line 34. The compressed air enters sleeve 18 causing expansion thereof to a point where stretching of the sleeve membrane occurs with this stretching being confined by cage 25. As best seen in FIGURE 8, the cross-sectional area of the inflated sleeve 18 is considerably larger than the cross-sectional area of bus bar 10 at offsets 15, 16.

Push rod 24 is then moved to the right with respect to FIGURE 8 moving bus bar 10 to the right into the inflated sleeve 18. Push rod 24 is then withdrawn to the left and the pressure within chamber 32 is reduced to atmospheric level. This permits sleeve 18 to become deflated and snugly fit bus bar 10.

While the process hereinbefore described caused the elastic sleeve to be inflated by injecting high pressure fluid into the interior thereof. This should not be construed as a limitation of the meaning of the claims which utilize the terminology of inflating the sleeve. This phrase is meant to cover not only the process of injecting high pressure fluid into the sleeve but includes any process by which a pressure differential is established between the inside and outside of the sleeve such that the sleeve is caused to expand.

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appending claims.

The embodiments of the invention in which an exclusive privilege or property is claimed are defined as follows:

1. Apparatus for forming an assembly by placing a rigid elongated member within a close fitting elongated sleeve of elastic material; said apparatus including an elongated chamber open at one end; a sealing means forming a closure for the other end of said chamber; an elongated cage at said one end and axially aligned with said chamber; a first clamp means surrounding said chamber for sealing a first end of the sleeve over said one end while said sleeve is in said cage; a second clamp means at the end of said cage remote from said chamber for sealing a second end of the sleeve within said cage; a rod slidably extending through said seal for moving said member from said chamber to said cage; and fluid pressure means connected to said chamber for applying fluid under pressure through said chamber into the interior of the sleeve within said cage to expand the sleeve and facilitate entry of said member into said sleeve.

2. Apparatus as set forth in claim 1 in which the cage is provided with an openable cover extending along the length of said cage for a distance sufficient to permit said rigid member to be inserted through said cover by movement transverse to the longitudinal axis of said cage.

3. Apparatus as set forth in claim 2 also including means for maintaining said cover in closed position while said sleeve is expanded.

References Cited by the Examiner

UNITED STATES PATENTS

| | | | |
|---|---|---|---|
| 710,817 | 10/02 | Stevens | 29—235 X |
| 2,293,426 | 8/42 | Coberly | 29—234 X |
| 2,645,004 | 7/53 | Dorner | 29—450 |
| 2,803,056 | 8/57 | Brissey et al. | 29—235 |

WILLIAM FELDMAN, *Primary Examiner.*

MILTON S. MEHR, *Examiner.*